(12) United States Patent
Adams

(10) Patent No.: US 9,834,897 B2
(45) Date of Patent: Dec. 5, 2017

(54) STANDING SHOVEL

(71) Applicant: Adams Mfg. Corp., Portersville, PA (US)

(72) Inventor: William E. Adams, Portersville, PA (US)

(73) Assignee: Adams Mfg. Corp., Portersville, PA (US)

( * ) Notice: Subject to any disclaimer, the term of this patent is extended or adjusted under 35 U.S.C. 154(b) by 0 days.

(21) Appl. No.: 15/366,134

(22) Filed: Dec. 1, 2016

(65) Prior Publication Data
US 2017/0081816 A1 Mar. 23, 2017

Related U.S. Application Data

(62) Division of application No. 14/538,174, filed on Nov. 11, 2014, now Pat. No. 9,540,781.

(51) Int. Cl.
A01B 1/02 (2006.01)
E01H 5/02 (2006.01)

(52) U.S. Cl.
CPC ............ E01H 5/02 (2013.01); A01B 1/026 (2013.01)

(58) Field of Classification Search
CPC ...................................................... E01H 5/02
USPC ............ 294/54.5, 58, 49, 57, 59, 176, 181; D8/10; 37/265, 285, 434; 16/430
See application file for complete search history.

(56) References Cited

U.S. PATENT DOCUMENTS

| | | | |
|---|---|---|---|
| 226,351 A | 4/1880 | Reddick | |
| 1,207,472 A | 12/1916 | Barton | |
| 1,353,307 A | 9/1920 | Berger | |
| 2,419,015 A | 4/1947 | Gascoigne | |
| 3,024,547 A | 3/1962 | Harrison | |
| 3,643,356 A | 2/1972 | Gohl | |
| 4,153,287 A | 5/1979 | Towsend | |
| 4,161,073 A | 7/1979 | Oakes | |
| 4,193,626 A | 3/1980 | Vondracek | |
| D271,369 S | 11/1983 | Gesner | |
| 4,461,458 A | 7/1984 | Poulin | |
| 4,531,713 A | 7/1985 | Balboni | |
| D305,603 S | 1/1990 | Nelson et al. | |
| 5,133,582 A * | 7/1992 | Rocha | A01B 1/026 16/426 |
| 5,581,915 A | 12/1996 | Lobato | |
| D377,300 S * | 1/1997 | Fredrick von Essen | D8/10 |
| 6,022,058 A | 2/2000 | O'Rourke | |
| D436,506 S * | 1/2001 | Crowe, Jr. | 294/58 |
| D445,235 S * | 7/2001 | Gibson | 294/176 |
| 6,416,097 B1 | 7/2002 | O'Rourke | |
| 6,944,980 B1 | 9/2005 | Lefrancois | |
| 7,044,520 B2 | 5/2006 | Roberson, Jr. et al. | |

(Continued)

Primary Examiner — Paul T Chin
(74) Attorney, Agent, or Firm — Buchanan Ingersoll & Rooney PC

(57) ABSTRACT

A tool adapted to collect, lift, and move material has a lifting structure attached to a collection element and at least one handle attached to the lifting structure. The lifting structure may have two or three segments. Each segment may have rails spaced apart and substantially parallel to each other with at least one cross member disposed there-between. The segments are oriented relative to one another to reduce the amount of bending required to lift material in the collection element. Adjacent segments in the lifting structure may be pivotally attached to each other. This tool can be free standing when used as a dustpan.

7 Claims, 7 Drawing Sheets

(56) References Cited

U.S. PATENT DOCUMENTS

| | | |
|---|---|---|
| D553,921 S | 10/2007 | Melady |
| 7,686,277 B2 | 3/2010 | Westgarde |
| D617,158 S | 6/2010 | Smith |
| D623,807 S | 9/2010 | Teren |
| D626,388 S | 11/2010 | Greenly et al. |
| D637,875 S | 5/2011 | Gehman |
| 7,946,637 B1 | 5/2011 | Gehman et al. |
| 8,038,192 B2 | 10/2011 | Claypool et al. |
| D651,488 S * | 1/2012 | Gehman et al. ................. D8/10 |
| D684,442 S | 6/2013 | Gehman et al. |
| 2012/0324676 A1 | 12/2012 | Guerra |

* cited by examiner

STANDING SHOVEL

TECHNICAL FIELD

The present disclosure generally relates to tool for collecting, lifting, and moving material, and specifically a tool having a multi-angled lifting structure.

BACKGROUND OF INVENTION

Tools commonly used to assist with displacement of material are shovels, scoops, scrappers and dustpans. When one uses a dustpan the person usually holds the dustpan in one hand and a broom in the other hand to sweep material into the dustpan. This process requires the user to bend over and such bending is difficult or painful for many people. Another option is to place the dustpan on the floor and sweep the material into the dustpan. But the dustpan may move such that much of the material is not swept into the dustpan. In the same way one can use a shovel as a dustpan by holding the shovel with one hand and the broom in the other hand to sweep material into the dustpan. But the same problems occur. Consequently, there is a need for a tool that can be used with a broom for the same purpose as a dustpan but not require the user to bend down to use the tool. This tool should also be able to be used as a shovel for both lifting and scraping.

Most shovels have a blade portion or collection portion that is attached to a long cylindrical handle. A handgrip may be provided at the end of the handle opposite the blade. In using the shovel the user must bend over to lift the contents of the shovel. There is a need for a shovel or similar lifting tool in which the handle is configured so that during use the user need not bend over as far as is required when using a conventional shovel.

Conventional shovels are displayed in bins or held on racks in the retail store. Because of their shape they are not easily stacked. When they are stacked they easily fall over. Consequently, there is a need for a shovel having a shape which enables the shovels to be neatly and easily stacked in a stack that does not fall over when in storage or on a retail floor.

SUMMARY OF THE INVENTION

I provide a tool having a collection element, a lifting structure, and at least one handle disposed on the lifting structure which can easily be used like a dustpan or used like a conventional shovel to lift and scrape snow or other material. Specific dimensions, relative angles, and configurations of the tool exemplified in various embodiments enable a user to collect, lift, and move material with less bending than is required when using a conventional shovel.

The lifting structure which functions like the handle of a conventional shovel has three segments. The first segment extends from the collection element so as to be substantially parallel to a back plate of the collection element. A second segment extends from the first segment so as to form an obtuse angle with respect to a rear of the collection element. The third segment extends from the second segment so as to be substantially parallel to the first segment. In some embodiments, each segment comprises a first rail and a second rail that is substantially parallel the first rail. At least one cross member is disposed between the first rail and the second rail of each segment. Some embodiments have at least one segment pivotally attached to another segment. The tool is preferably provided with a retention mechanism to selectively retain the pivotally attached segments at desired angles relative to each other.

I also provide an optional support stand attached to the collection element and/or the lifting structure, which enables the tool to stand self-supported. The support stand is preferably pivotally attached to the tool via a pivot assembly. The tool may be provided with a retention mechanism connected to the lifting structure and the support stand, which may be configured to selectively retain the pivotally attached support stand at a desired angle. Other embodiments provide for a brush member that may be attached to the tool. The support stand and brush member may be configured to be interchangeable or the brush may be removably attached to the support stand. The support stand, the brush member, or both may be provided with an extension and retraction means.

A stiffener strip may be disposed on the collection plate, which may provide a desired front edge configuration, stiffness, or rigidity to the collection plate. The stiffener strip may be a separate piece that is permanently attached or is removable. It may also be co-injected, with a harder wearing/cutting surface like nylon to act as a cutting edge that protects the softer plastic, like polypropylene, behind it. The stiffener strip may be configured to be sacrificial.

Components of various embodiments of the tool may be fabricated as one unitary unit or may be constructed of modular pieces. Each component piece may be permanently or removably secured to the other. A component may be made to be interchangeable and/or replaceable with another component.

While these potential advantages are made possible by technical solutions offered herein, they are not required to be achieved. Other advantages will become apparent from the description of certain present preferred embodiments shown in the drawings.

DETAILED DESCRIPTION OF THE PREFERRED EMBODIMENTS

Figure 1:
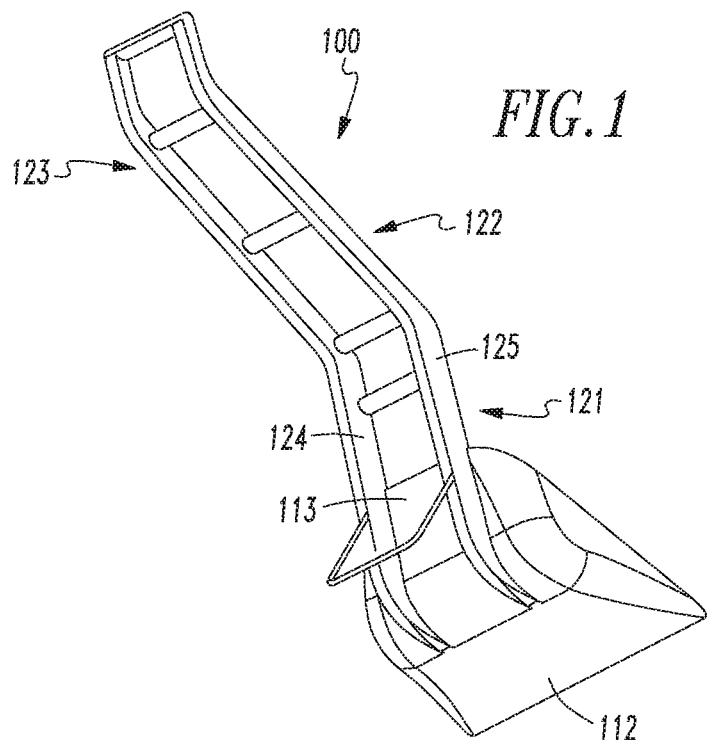
FIG. 1 is a rear perspective view of the tool having an optional support stand, in accordance with a preferred embodiment of the present disclosure.

The standing shovel comprises a collection element 110, a lifting structure 120, and at least one handle 130 disposed on the lifting structure 120, hereinafter identified as the "tool" 100. While exemplary embodiments may illustrate the tool 100 as a shovel, one skilled in the art will appreciate, with the benefit of the present disclosure, that configurations and uses of the tool 100 are not limited to that of a shovel. The tool 100 may be configured and employed as any type of excavator, gathering tool, and/or a cleaning tool. For example, the tool 100 may also be configured and/or used as a scrapper, a scoop or a dustpan.

The present disclosure may reference a constituent part or user in singular, but it is understood that a plurality thereof may be utilized and that any description of singulars is done for the sake of ease of illustration and brevity. The same reference may include the singular or plurality of that constituent part or user without deviating from the teachings of the tool 100.

Referring now to FIGS. 1-4, various views of the tool 100 with an optional support stand 140, in accordance with a preferred embodiment of the present disclosure, are disclosed. The tool 100 comprises a lifting structure 120 extending from a collection element 110 with at least one handle 130 disposed on the lifting structure 120. A user uses the collection element 110 to collect, lift, and move material while exploiting the leverage and ergonomics provided by the tool 100 to perform work in an efficient, effective, and salutary manner. The handle 130 is provided to assist a user with grasping and manipulation of the tool 100. The tool 100 is preferably fabricated from a rigid, light-weight, durable material. This may include, but is not limited to plastic, fiberglass and aluminum. The selected material should have material properties that provide suitable operable ductility and malleability characteristics within a range of temperatures that occur where the tool may be used (e.g., −40° F. to 120° F.).

The collection element 110 comprises a first side panel 111*a*, a second side panel 111*b*, a collection plate 112, and a back plate 113 conjoined to form a collection cavity 114 at a front side 115*a* of the back plate 113. The lifting structure 120 comprises at least one segment 121, 122, 123. A first segment 121 extends from the back plate 113, preferably from a rear side 115*b* of the back plate 113, and connects to a second segment 122. The second segment 122 is connected to a third segment 123. Preferably, the first segment 121 is substantially parallel to the back plate 113, the second segment 122 extends from the first segment 121 and forms an obtuse angle with respect to the rear side 115*b* of the back plate 113, and the third segment 123 extends from the second segment 122 and is substantially parallel to the first segment 121. The handle 130 is preferably disposed on the lifting structure 120.

Preferably, the first segment 121, second segment 122, and third segment 123 each comprise a first rail 124 and a second rail 125. However, it is understood that only one segment 121-123, or any number of segments 121-123, may comprise a first rail 124 and a second rail 125. The first rail 124 of any segment 121-123 may be substantially parallel the second rail 125 of the same segment 121-123. Any rail 124, 125 may be configured as a U-shaped channel to maximize structural support but minimize weight. Preferably, a cross member 126*a*, 126*b*, 126*c*, 126*d* is disposed between the first and second rails 124, 125 of any segment 121-123. A cross member 126*a-d* may be configured to connect the first and second rails 124, 125 of a same segment 121-123 or a different segment 121-123. In a preferred embodiment, the first cross member 126*a* is disposed near a top of the first segment 121, the second cross member 126*b* is disposed near a bottom of the second segment 122, the third cross member 126*c* is disposed near a midpoint of the second segment 122, the fourth cross member 126*d* is disposed near a top of the second segment 122, and the handle 130 is disposed near a top of the third segment 123.

Any cross member 126*a-d* may be configured as a handle 130. Preferably, all cross members 126*a-d* are configured as a handle 130 so that a user may grasp any cross member 126*a-d* to manipulate the tool 100 without having to compromise balance, position, or leverage. This configuration enables easy lifting with improved ergonomics.

In a preferred embodiment, at least one stiffener strip 170 is disposed on the collection plate 112. The stiffener strip 170 is preferably disposed along the front edge 116 of the collection plate 112. The stiffener strip 170 may be permanently affixed or temporarily affixed thereto. An adhesive, welding or rivets could be used to permanently affix the stiffener strip while screws or an interference fit would enable the stiffener strip to be removable. The stiffener strip 170 may be metal, plastic or a composite material and also provide wear resistance.

Figure 4:
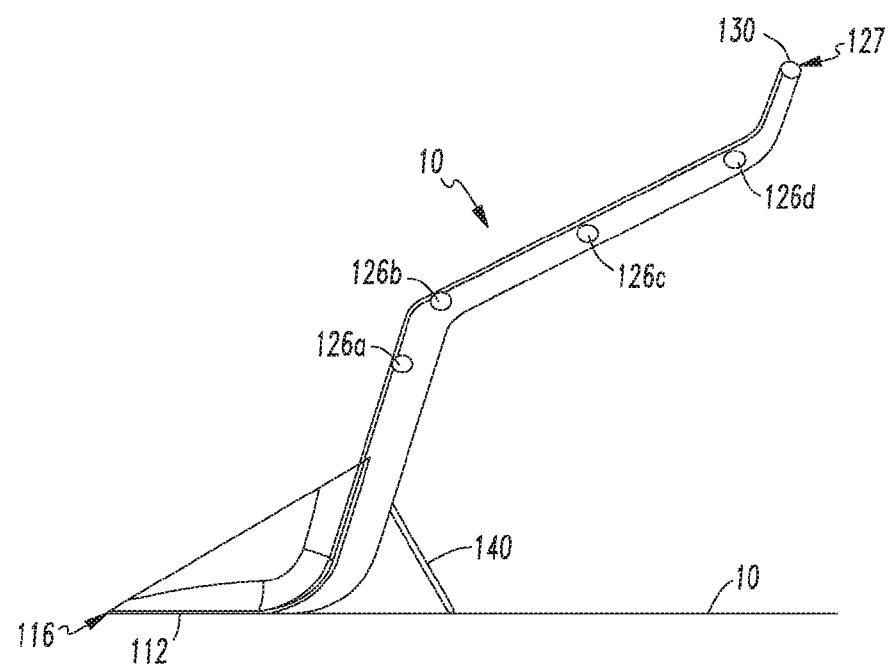
FIG. 4 is a side cross sectional view along the line A-A in FIG. 3.
Figure 5:
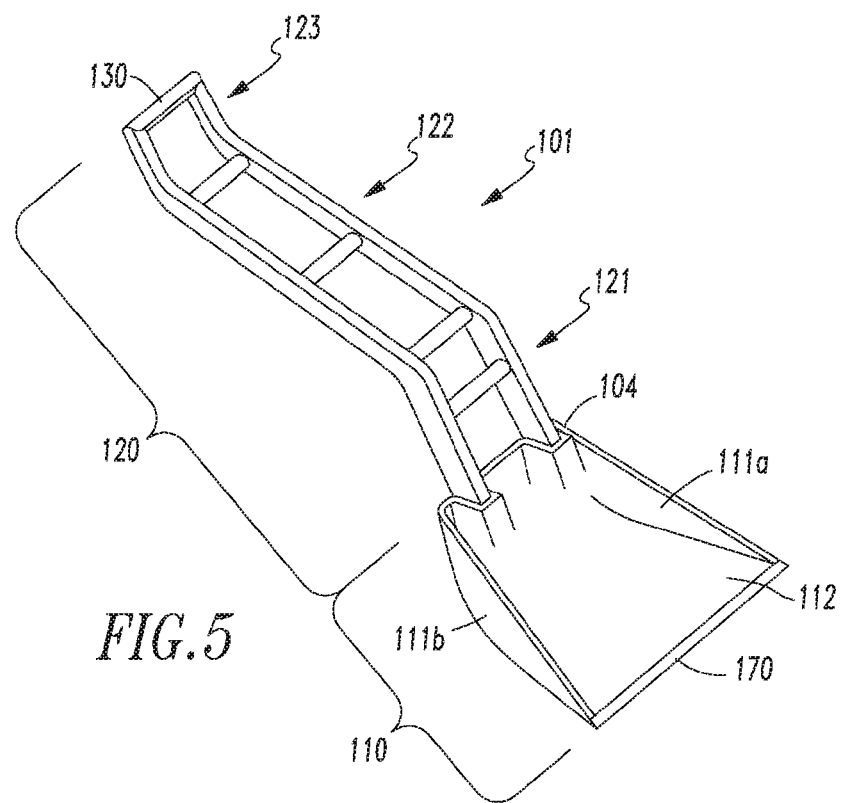
FIG. 5 is a perspective view a second present preferred embodiment of the tool in which the lifting element is removable from the collection element.

A perspective view of another present preferred embodiment of the tool 101 having a removable collection element 110 is shown in FIG. 5. The collection element 110 and the lifting element 120 are similar to the collection element and the lifting element 120 in the previous embodiment. However, the ends of the lower segment 121 of the lifting element fit into slots 104 provided in the collection element. Components 121, 122 and 123 of the lifting portion 120 of this tool 101, as well as in the tools 100 of the previous embodiments shown in FIGS. 1-4, may be fabricated as a unitary unit or may be constructed of modular pieces. For example, a lifting structure 120 may be a construction of separate segments 121-123 connected to each other via welding.

Where the tool 100, 101 is made from modular components, each piece may be permanently or removably secured to the other. A means to temporarily secure a piece may be, but is not limited to, threading engagements, a quick connect-disconnect coupling, a quick connect bayonet style fastener, quick-connect magnetic couplings, a detent and spring-loaded pin tumbler assembly, deflection clips, a tension knob/screw assembly, and an interference fit. In some embodiments, a component may be made to be interchangeable and/or replaceable. For example, if a collection element 110 is damaged, a user may replace it with another collection element 110. As another example, a first collection element 110 may be configured with a steep sloping back plate 113 and a flat collection plate 112, whereas a second collection element 110 may be configured with a curved back plate 113 and an undulated collection plate 112. A user may desire to interchange the first and second collection elements 110 to accommodate a type of work being performed with the tool 100.

Figure 6:
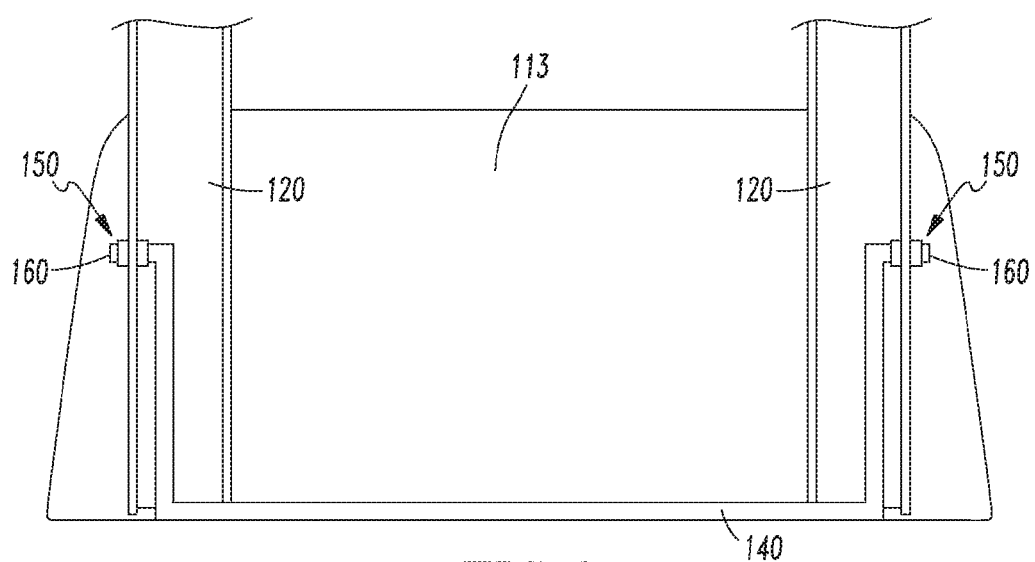
FIG. 6 is rear partial view of the tool shown in FIG. 5 showing the support stand attached to the tool via a pivot assembly, in accordance with a present preferred embodiment of the present disclosure.

Referring now to FIG. 6, the support stand 140 may be attached to the tool 100, 101 via a pivot assembly 150. This assembly may include a ratchet mechanism or other retention mechanism 160 which enables the support stand to be held in any of several selected positions including a stowed position and deployed positions. The retention mechanism 160 may include, but is not limited to, a detent and spring-loaded pin tumbler assembly, deflection clips, or a tension knob/screw assembly. The pivot assembly 150 may also be configured to enable removable attachment of the support stand 140. This may be achieved, for example, via an interference fit of the support stand 140 with at least one C-shaped resilient collar (not shown) affixed to a portion of the tool 100, 101. The support stand 140 may be a bent metal rod or wire or a molded plastic, fiberglass, or composite material structure. There may also be a molded support connected with a living hinge to the shovel/dustpan to achieve better vertical positioning.

Figure 7:
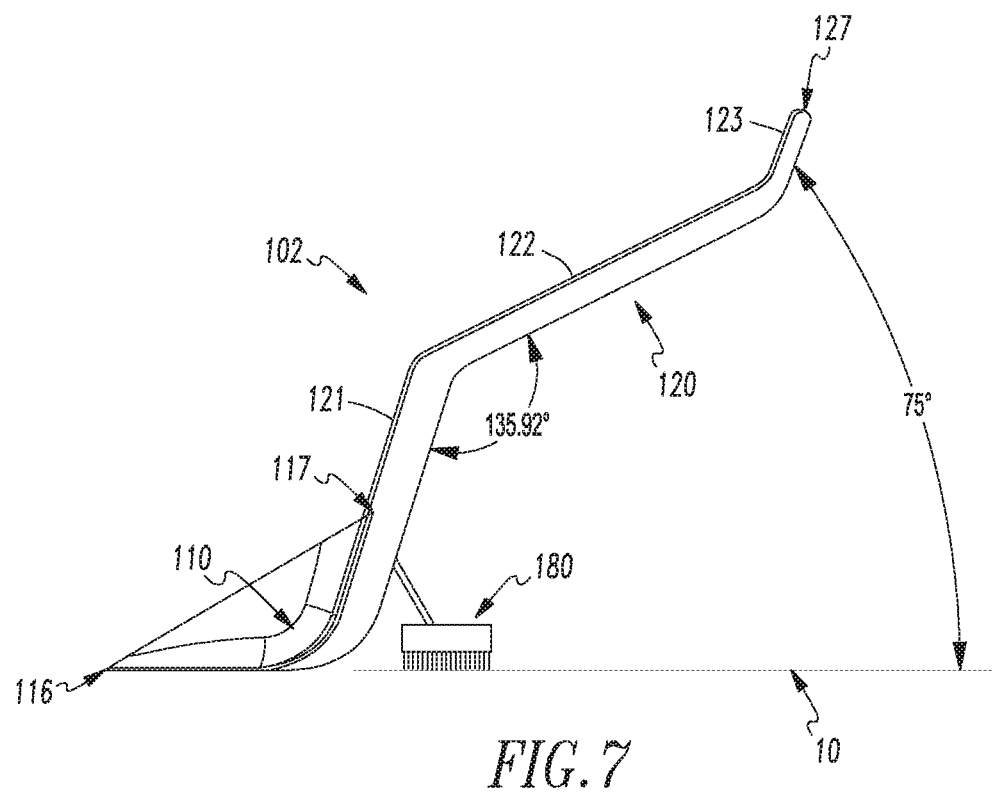
FIG. 7 is a side view of the another present preferred embodiment of our tool which has a brush member.

Referring now to FIG. 7, a side view of another present preferred embodiment of our tool 102 has a brush member 180. The brush member 180 may be attached in a similar manner as the support stand 140. Some embodiments enable the brush member 180 and the support stand 140 to be interchangeable. Alternatively, a brush head may be removably attached to the support stand. A brush member 180 may comprise a brush head with a bristled surface; however, other configurations of brush members 180 may be utilized. This may include, but is not limited to, a bristled roller, a motorized brush and a squeegee. Prongs may be provided to allow the shovel to be used to clean stables and stalls.

The support stand 140 and the brush member 180 may be provided with an extension and retraction means (not shown). This may be achieved by a telescoping engagement of support arms that connect the support stand 140 and/or the brush member 180 to the back of the collection element 110 or to the lifting element 120. Other extension and retraction means may be utilized.

Figure 2:
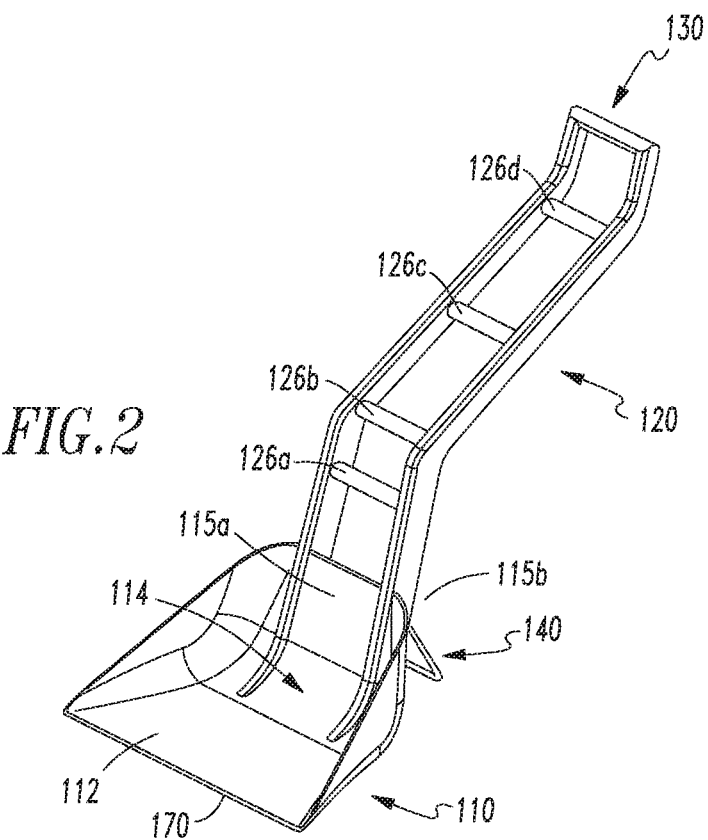
FIG. 2 is a front perspective view of the tool shown in FIG. 1 with an optional stiffening strip.
Figure 3:
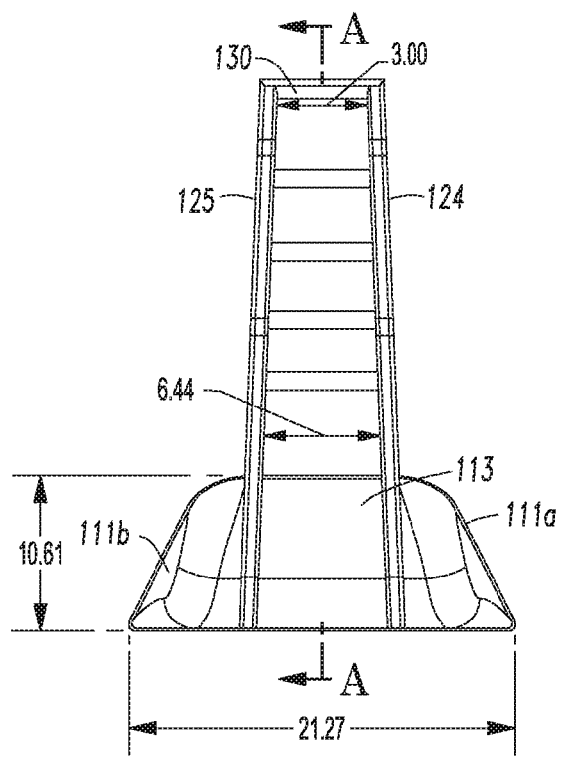
FIG. 3 is a front view of the tool shown in FIG. 1.

All of the embodiments of the tool 100, 101, 102 have preferred dimensions and configurations which are given in FIGS. 2, 4 and 7. In the preferred embodiments, the first segment 121 forms a 75 degree angle with respect to a plane 10 running through the collection plate 112, the second segment 122 forms a 30.92 degree angle with respect to the plane 10 running through the collection plate 112, and the third segment 123 forms a 75 degree angle with respect to the plane 10 running through the collection plate 112. While these angles are preferred to provide the best ergonomic shape, each angle can be increased or decreased by up to five degrees and the tool will still provide some benefit to the user in ease of lifting, scraping or pulling.

In the preferred embodiments, when the tool 100 is positioned such that the collection plate 112 is horizontal: 1) a horizontal distance from a front edge 116 of the collection plate 112 to a top edge 117 of the back plate 113 is 15.4 inches; 2) a vertical distance from the front edge 116 of the collection plate 112 to the top edge 117 of the back plate 113 is 10.61 inches; 3) a horizontal distance from the front edge 116 of the collection plate 112 to a top edge 127 of the third segment 123 is 39.84 inches; 4) a vertical distance from the front edge 116 of the collection plate 112 to the top edge 127 of the third segment 123 is 37.74 inches; 5) a distance between an outer most portion of the first side panel 111a and an outer most portion of the second side panel 111b is 21.27 inches; 6) a distance between the first and second rails 124, 125 near the top edge 127 of the third segment 123 is 3 inches and a distance between the first and second rails 124, 125 near the top edge 117 of the back plate 113 is 6.44 inches; 7) a vertical distance between the plane 10 running through the collection plate 112 and the first cross member 126a is 17.05 inches and a horizontal distance between the front edge 116 of the collection plate 112 and the first cross member 126a is 17.02 inches; 8) a vertical distance between the plane 10 running through the collection plate 112 and the second cross member 126b is 21.27 inches and a horizontal distance between the front edge 116 of the collection plate 112 and the second cross member 126b is 19.23 inches; 9) a vertical distance between the plane 10 running through the collection plate 112 and the third cross member 126c is 25.89 inches and a horizontal distance between the front edge 116 of the collection plate 112 and the third cross member 126c is 27.60 inches; 10) a vertical distance between the plane 10 running through the collection plate 112 and the fourth cross member 126d is 30.96 inches and a horizontal distance between the front edge 116 of the collection plate 112 and the fourth cross member 126d is 36.01 inches; and, 11) a vertical distance between the plane 10 running through the collection plate 112 and the handle 130 is 37.12 inches and a horizontal distance between the front edge 116 of the collection plate 112 and the handle 130 is 39.22 inches. While these dimensions can provide the best ergonomic shape for most users, each distance can be within a range of distances determined by rounding the preferred distance stated here to the nearest inch and then adding or subtracting two inches.

It is envisioned for the tool 100, 101, 102 to be employed as a snow shovel. The delineated dimensions and relative angles of component parts are provided as the best mode to enable an effective, efficient, and salutary use of the tool as a snow shovel. Various embodiments are envisioned to account for varying physical faculties of users and to incorporate biomechanics into the tool. Embodiments illustrating component parts having specific dimensions, specific placement, and specific relative angles are preferred embodiments, and are not to be viewed as limiting. As an example, an exemplary embodiment discloses four cross members 126a-d and a handle 130 disposed on segments 121-123 connected to each other at various relative angles. This configuration enables easy lifting with less bending over, thereby providing ease of use and improved ergonomics.

Figure 8:
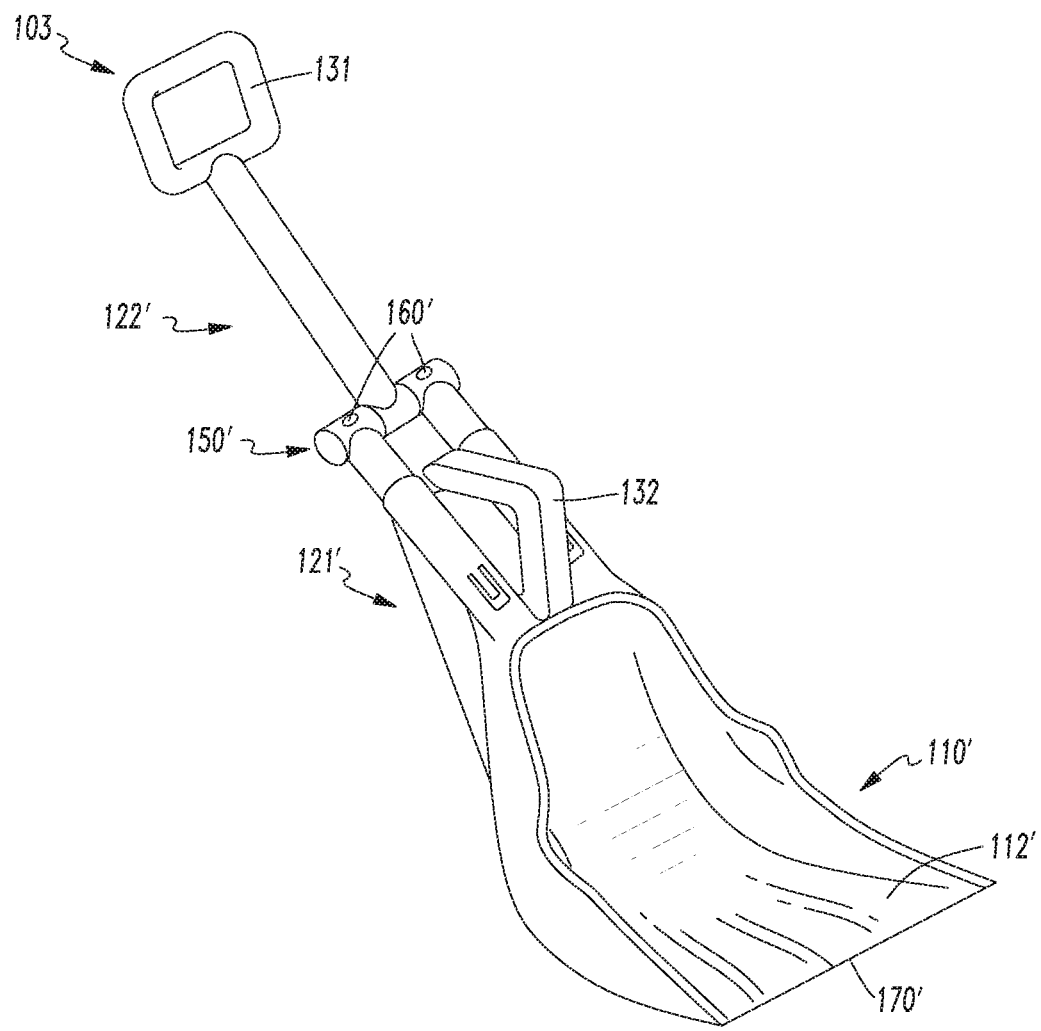
FIG. 8 is a perspective front view of another present preferred embodiment of the tool in which the first segment is pivotally attached to a second segment.
Figure 9:
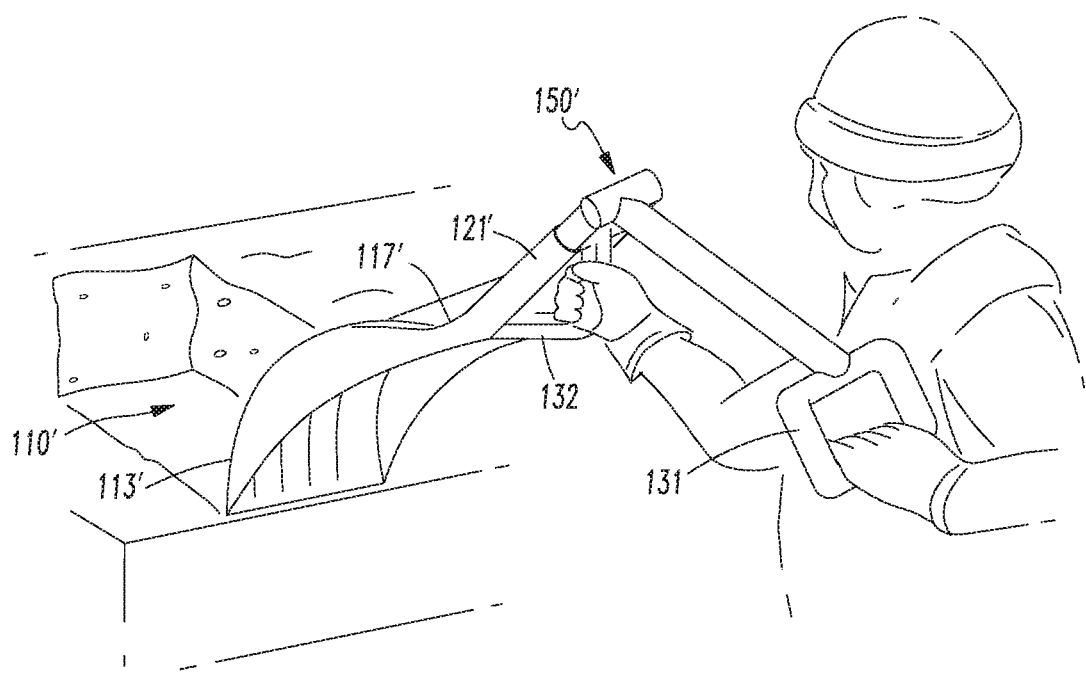
FIG. 9 is a perspective view of the tool shown in FIG. 8 being used to scrape snow from a step; and, FIG. 10 is a perspective view of the tool shown in FIG. 8 in self-supporting configuration while being used as a dustpan.
Figure 10:
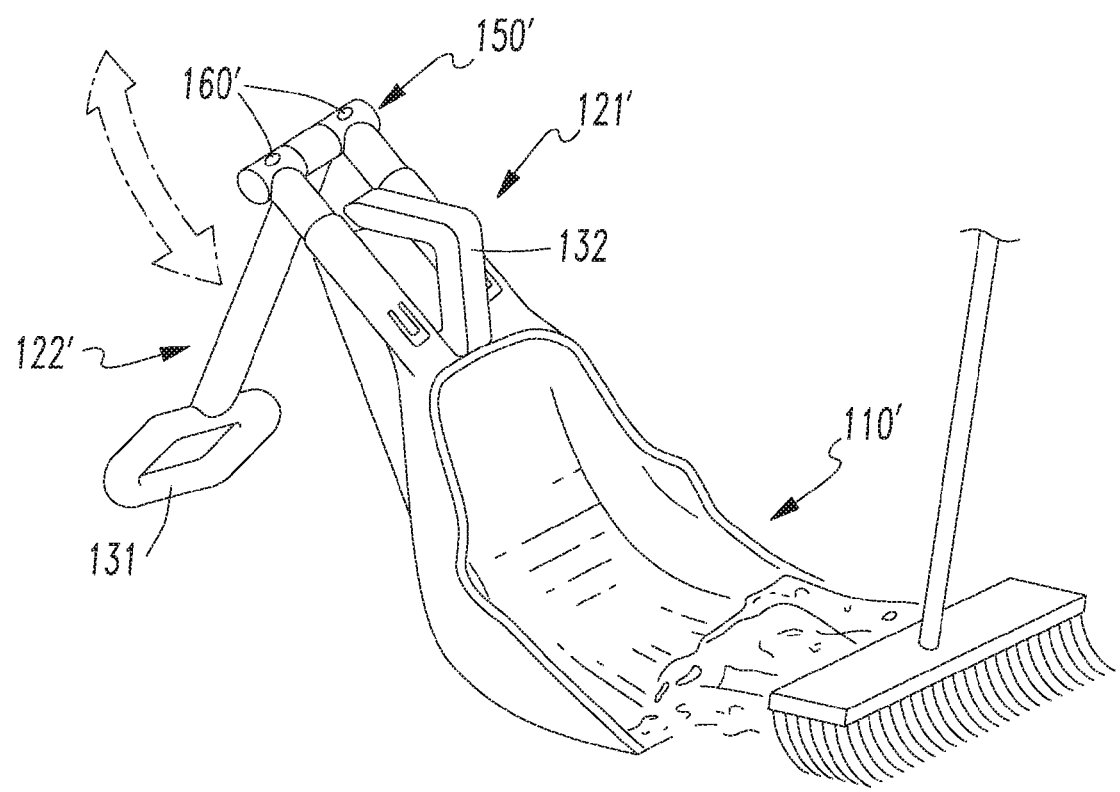

In another present preferred embodiment of our tool 103 shown in FIGS. 8-10, one segment 121' of the lifting structure is pivotally attached to another segment 122' of the lifting structure. As shown in FIG. 9 the pivotal connection and second handle 132 allow the tool to be configured and turned upside down and used as a scraper for pulling snow, as when standing on a lower step and pulling snow downwards from higher steps. When the shovel is upside down, a pulling surface is provided and snow or other material may be pulled down and toward the user, or off to one side. The pivotal connection also enables the tool to be self-supporting as shown in FIG. 10. When the tool is positioned as shown in FIG. 10, a user can easily sweep debris onto the collection element 110'. The same shovel therefore works as a shovel, puller, and dustpan.

The pivot assembly 150' may be configured in any manner described above for the pivot assembly 150 of the support stand 140. With such an embodiment, the tool 100' is preferably provided with a retention mechanism 160' connected to the first segment 121' and second segment 122' to selectively retain the pivotally attached segments 121', 122' at desired angles relative to each other. The retention mechanism 160' may be configured in any manner described above for the retention mechanism 160 of the support stand 140.

In the embodiment 103 shown in FIGS. 8-10 a first handle 131 is disposed on the distal end of the second segment 122' and a second handle 132 is disposed on the first segment 121'. The first segment 121' is attached to the collection element 110' and is pivotally attached to the second segment 122'. The first handle 131 is preferably D-shaped. Preferably, a stiffener strip 170' is disposed on the collection plate 112'.

The configuration of the tool 103 and placement of the first and second handles 131, 132 is such as to enable a user to grasp the first handle 131 with a first hand and the second handle 132 with a second hand. The pivot assembly 150' may enable a user to actuate the first and second segments 121', 122' in a scissor motion or may maintain these segments is a fixed relationship.

Various embodiments may provide for a nonslip surface on any portion of the tool 100, 101, 102, 103. This may be achieved by providing a textured surface thereto. This may also be achieved by disposing a coating thereto. This coating may include paint, rubber, silicon, polymer, etc. In addition, any portion of the tool 100 may be provided with a protective coating that inhibits corrosion and/or oxidation of the tool.

All of the embodiments shown in the drawings are configured so the several tools may be stacked one on top of another. The stack will be tight thereby minimizing the space requires to store and to display several tools.

While various exemplary embodiments of our tool have been described above, it should be understood that they have been presented for purposes of example only, and are not to be viewed as limitations. It is not exhaustive and does not limit our tool to the precise form disclosed. Modifications and variations are possible in light of the above teachings or may be acquired from practicing of the disclosure, without departing from the breadth or scope.

I claim:

1. A tool, comprising:
   a collection element comprising a first side panel, a second side panel, a collection plate, and a back plate conjoined to form a collection cavity at a front side of the back plate;
   a lifting structure comprising a first segment and a second segment pivotally attached to each other via a pivot assembly, wherein the first segment is statically attached to the collection element and the second segment is capable of being pivoted to a position that enables the tool to be self-supporting and used as a dust pan;
   a retention mechanism connected to the first segment and second segment to selectively retain the first segment in a desired position relative to the second segment; and,
   a first handle disposed on the first segment and a second handle disposed on the second segment.

2. The tool recited in claim 1, further comprising a nonslip surface applied to at least a portion of the tool.

3. The tool recited in claim 2, wherein the first handle is D-shaped.

4. The tool recited in claim 1, wherein the tool is configured to enable a user to grasp the first handle with a first hand and the second handle with a second hand.

5. The tool recited in claim 1, wherein at least one of the collection element, the first segment, the second segment, and the first handle is a unitary piece.

6. The tool recited in claim 5, wherein the collection element is removably attachable to the first segment.

7. The tool recited in claim 1 further comprising at least one stiffener strip disposed on the collection plate.

* * * * *